United States Patent
Moreland, Jr. et al.

[15] 3,666,999
[45] May 30, 1972

[54] APPARATUS FOR PROVIDING SIGNALS CORRESPONDING TO THE VISCOSITY OF A LIQUID

[72] Inventors: Sam L. Moreland, Jr., Groves, Tex.; Nelson B. Haskell, Jefferson County; Thomas B. Smitherman, East Baton Rouge Parish, both of La.

[73] Assignee: Texaco, Inc., New York, N.Y. ; by said Moreland

[22] Filed: June 22, 1970

[21] Appl. No.: 48,243

[52] U.S. Cl. ..................317/127, 307/252 R, 307/308, 307/311, 317/148.5 B, 317/DIG. 3
[51] Int. Cl..................H01h 47/24, H01h 47/32
[58] Field of Search..............317/148.5 R, 148.5 B, 149, 317/127; 307/308, 311, 252 R, 284; 328/1

[56] References Cited

UNITED STATES PATENTS

| | | | |
|---|---|---|---|
| 3,454,796 | 7/1969 | Bell | 307/284 X |
| 3,271,677 | 9/1966 | Peter et al. | 317/127 X |
| 3,295,421 | 1/1967 | McCormick | 317/148.5 B |
| 3,475,625 | 10/1969 | Cochran, Jr. | 307/284 X |

Primary Examiner—Lee T. Hix
Attorney—Thomas H. Whaley and Carl G. Reis

[57] ABSTRACT

Apparatus, which may be used with a computer, senses the passage of the meniscus of a liquid column between two predetermined levels. The time for the passage of the meniscus of the liquid column corresponds to the viscosity of the liquid. As the meniscus of the liquid column passes between a light source and a photo tube arranged at each predetermined level, the quantity of light from the light source reaching a photo tube changes causing an output from the photo tube to change accordingly. Trigger circuits convert the changes in the photo tube outputs to pulses. A logic circuit has two input circuits, each input circuit being connected to a different trigger circuit and having trippable means. Each trippable means is tripped by the first pulse from a corresponding trigger circuit so that the logic circuit is responsive to only the first pulse from each trigger circuit to provide two output pulses. The time interval between the two output pulses is substantially equal to the passage time of the liquid column. A relay is energized in response to the two output pulses from the logic circuit for the time interval between the two output pulses to effectively provide input signals to the computer which may compute the liquid's viscosity.

The trippable means in the logic circuit must be reset before another viscosity measurement can be made.

13 Claims, 4 Drawing Figures

Patented May 30, 1972  3,666,999

APPARATUS FOR PROVIDING SIGNALS CORRESPONDING TO THE VISCOSITY OF A LIQUID

BACKGROUND OF THE INVENTION

1. Field of the Invention

This invention relates to the field of computer interface systems, in general, and more specifically it concerns a logic circuit system that is particularly adapted for use in timing the passage of a meniscus between two spaced points along a column of a liquid, the viscosity of which is being measured.

2. Description of the Prior Art

While it is known to provide systems that will electrically detect the passage of a meniscus in a liquid column (so as to time the passage thereof over a given distance) such known arrangements are not adaptable as a computer interface system of the type contemplated by this invention. Furthermore, known prior systems did not provide for blocking disturbance signals that might appear at the unwanted sensing unit, out of a predetermined sequential order. Therefore, false readings might result.

SUMMARY OF THE INVENTION

Briefly, the invention concerns a computer interface system for use with a viscosity measurement that includes timing the passage of a column of the meniscus of a column of liquid the viscosity of which is being measured. It comprises in combination first means for sensing the passage of said meniscus at a predetermined location along said column and for providing a first signal representative thereof, and second means for sensing the passage of said meniscus at a second predetermined location along said column spaced from said first location and for providing a second signal representative thereof. The combination also comprises logic circuit means for receiving said first and second signals in sequence and for providing output signals corresponding thereto. The said logic circuit means comprises a silicon controlled rectifier in each of said input circuits, and one of said silicon controlled rectifiers being connected into a flip-flop circuit with a third silicon controlled rectifier. The logic circuit also comprises an OR circuit including a pair of rectifiers for passing said output signals from either of said input circuits, and a relay having contacts in an input circuit for said computer and having a coil for actuating said contacts. The logic circuit also comprises relay driver means connected to said OR circuit and having timing means for determining the duration of energization of said coil upon receipt of each of said output signals.

Again, briefly, the invention concerns a logic circuit having two input circuits and an output circuit. It comprises in combination trippable means in each of said input circuits for passing no signals after having been tripped, but passing a pulse signal when tripped after having been set. It also comprises bi-stable means associated with said trippable means, said bi-stable means including one of said trippable means. And it comprises circuit means connected to said bi-stable means for providing output signals at said output circuit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
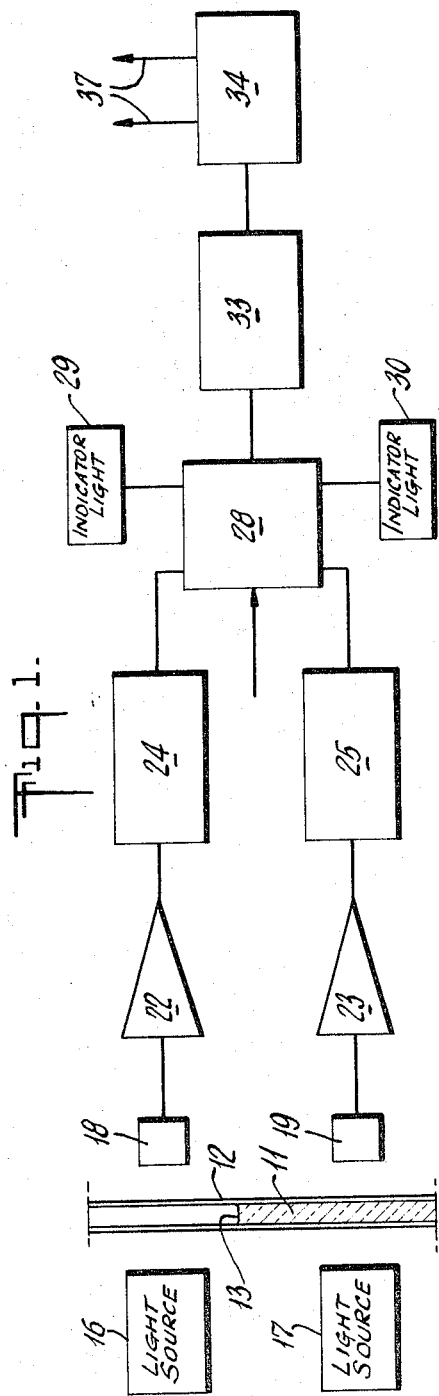
FIG. 1 is a block diagram illustrating a complete system according to the invention.

Referring to FIG. 1, it is pointed out that a system according to this invention is particularly adapted for use with a process where the viscosity of a liquid is being measured. However, it will be understood that this computer interface system may be employed in other and different uses without altering the concepts of the invention.

The preferred embodiment described here provides for a relay actuation that will give a computer applicable contact closure signal. It will take place at the passage of a fluid column meniscus. Such signal is developed as the meniscus passes each of two spaced locations, so that the time interval between such meniscus passing may be timed in the computer and/or recorded for use as desired.

It may be noted that the system is being applied to a viscometer and the measurements will be made as the viscometer is put through a run under standard operation procedures. Thus, the viscometer has a column of liquid 11 within a tubular passage 12 that creates a meniscus 13 at the top of the liquid column 11.

The viscosity measurement is related to the time it takes for passage of the meniscus 13 between two spaced points along the column of liquid formed within the tube 12. These points are determined by the location of a pair of light sources 16 and 17 which each direct a beam of light through the tube 12 toward a photo tube 18 and 19 respectively.

Of course, the tube 12 must be capable of transmitting light therethrough. Consequently, when the meniscus 13 passes each location there will be a difference in the amount of light transmitted to each photo tube and this will provide an electrical signal which is amplified by either an amplifier 22 or 23 depending upon which of the photo tubes 18 or 19 is effected in each case. The outputs from the amplifiers 22 and 23 are each transmitted to a trigger circuit 24 or 25 respectively to provide the proper form of signal for being transmitted on to the input of a logic circuit 28. The logic circuit includes two indicator lights 29 and 30 which indicate the state of the logic circuit at any given time.

The logic circuit 28 feeds its output signals to a relay driver circuit 33 which in turn acts to energize a relay 34 for a predetermined time duration of contact closure. The relay contacts are in a computer input circuit that is indicated by a pair of arrows 37.

Assuming that the column of liquid 11 is falling, the system operates to provide a first signal when miniscus 13 crosses the path of the light beam from source 16 to photo cell 18. This signal is amplified by the amplifier 22 which actuates the trigger circuit 24. The trigger circuit, in turn, provides an input to actuate the logic circuit 28 which previously was manually set to receive signals from the output of trigger 24, while blocking any signals from the other trigger 25. The signal received from trigger 24 is passed on, as the logic circuit is actuated, and goes to the relay driver circuit 33. The driver circuit in its turn, actuates the relay 34 for a predetermined time duration, after which it automatically opens again. The foregoing provides a circuit closing on the output connections 37 that are connected to a computer process interrupt.

It will be appreciated that the length of time the circuit is closed must be compatible to the process interrupt latch in time. In the computer (not shown) the process interrupt will be latched in via computer circuits and unlatched via computer program and circuits at a later time to await contact closure on the connections 37 again when actuated from the other photocell 19.

At the passage of the first signal through logic circuit 28 it will act to block out further signals from that input and sensitize the input from the other location, i.e., photo tube 19, via amplifier 23 and trigger circuit 25. Consequently, when the signal is developed upon passage of meniscus 13 at the photo tube 19, the logic circuit 28 will again develop and pass a signal to the relay driver circuit 33 which once more actuates the relay 34 under the control of a timing circuit (incorporated in the driver 33) to cause the relay to close for a predetermined time duration and then open once more.

After the second signal (caused by the passage of the meniscus 13 at photo tube 19) the logic circuit 28 will be blocked so that no signal passage from either channel can take place. It will remain in this blocked, or tripped condition until it has been reset prior to the beginning of another viscosity measurement.

It will be appreciated that if reverse flow of the liquid column is employed so that the meniscus moves upward instead of downward through the tube 12, the procedure will be the same and the connections of the photocells 18 and 19 to the amplifiers 22 and 23 would be reversed.

Figure 2:
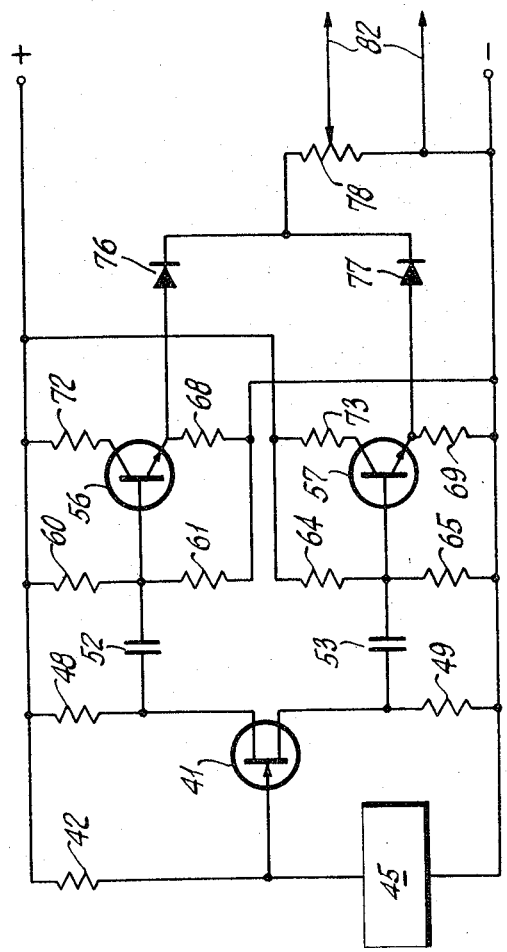
FIG. 2 is a circuit diagram illustrating one of the amplifiers that may be employed for providing a signal upon passage of the meniscus at one of the two locations along the column of liquid.

The entire operation of the system will be more fully appreciated as the details of individual circuit elements are developed. Thus, with reference to FIG. 2, it is pointed out that this circuit represents a preferred amplifier circuit for either of the amplifiers 22 or 23. There is a field effect transistor 41 that receives signals from an IR drop across a resistor 42. Such IR drop signals are due to variations of current flow through a photocell 45. These variations are in turn caused by changes in the light intensity striking the photocell. The transistor 41 acts as a phase inverter and output signals are developed across a pair of resistors 48 and 49 which have equal value. These signals are coupled via a pair of capacitors 52 and 53 respectively, to the respective bases of a pair of transistors 56 and 57.

There are a pair of resistors 60 and 61 that make up a dividing network to bias the transistor 56. Similarly, there are resistors 64 and 65 which bias the other transistor 57.

The transistors 56 and 57 are connected as emitter followers. They have output signals that are developed across, respectively, a resistor 68 for transistor 56 and a resistor 69 for transistor 57. Resistors 72 and 73 are merely connected as current limiting resistors for the transistors 56 and 57 respectively.

There are two diodes 76 and 77 that are connected to the emitters of the transistors 56 and 57 respectively. These diodes together with a resistor 78 form an OR circuit which allows positive going signals from either transistor 56 or 57 to actuate the trigger circuit to which the amplifier is connected to the system illustrated in FIG. 1. This is accomplished via the output circuit that is indicated at a pair of output wires 82 (FIG. 2) which are connected to the adjustable side of a potentiometer which is formed using the resistor 78. The potentiometer may be set to adjust the no signal voltage level going to the trigger circuit, and, consequently, it acts as a sensitivity adjustment.

The trigger circuits 24 and 25 are employed to supply the necessary impulse, in each case, to the input of the logic circuit 28. Such impulse supplying triggers are well known in general. The particular triggers used in the preferred embodiment may be the type of commercially available units that are manufactured in encapsulated form. For example, there is a trigger circuit manufactured by California Electronic Manufacturing Co., Inc., the address of which is P.O. Box 555, Alamo, California 94507. That unit is designated Voltsensor-Model 500.

Figures 3, 4:
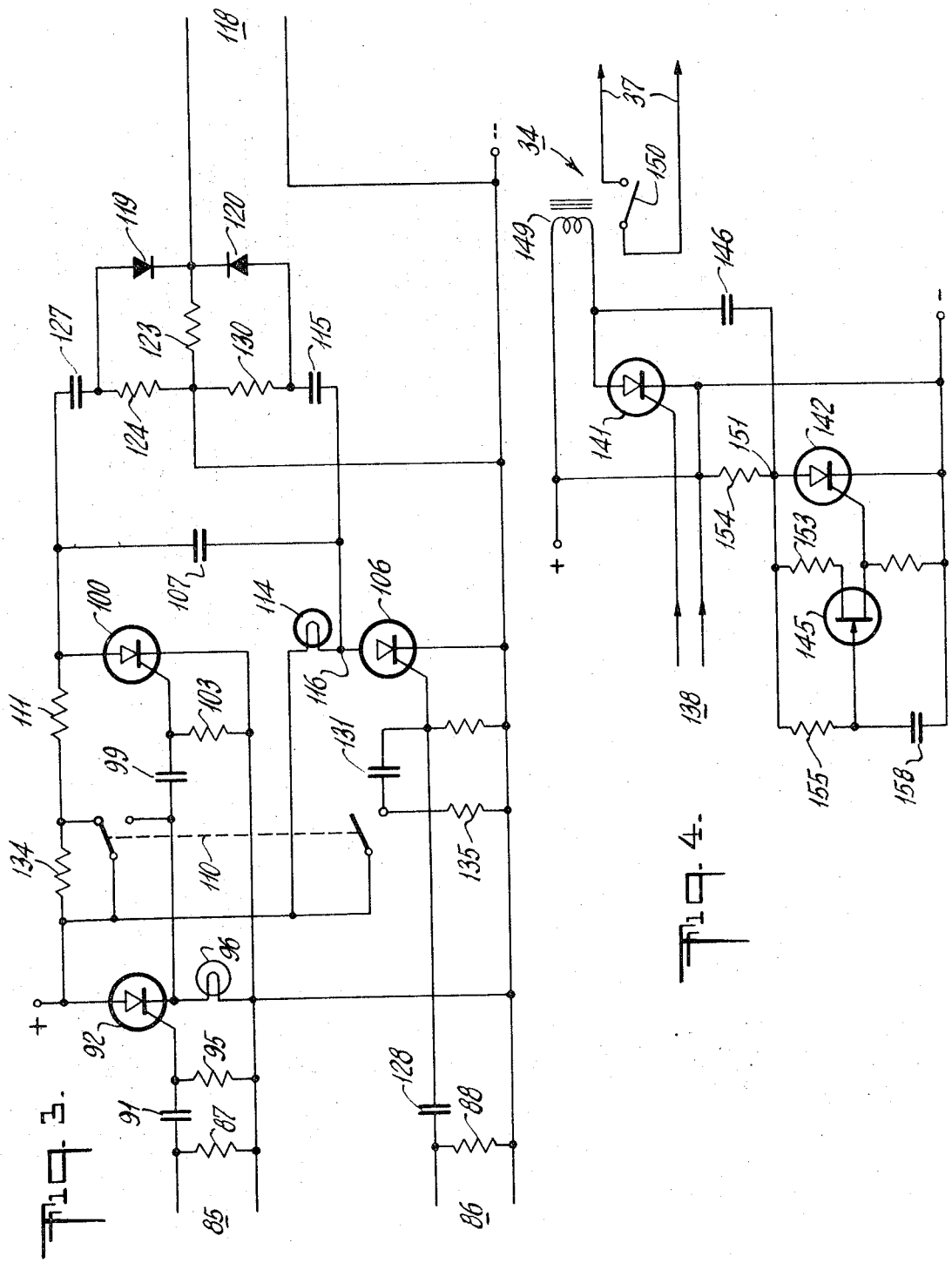
FIG. 3 is a circuit diagram of a logic circuit according to the invention that is part of the system.
FIG. 4 is a circuit diagram of a so-called driver circuit for energizing a relay that provides computer input signals.

The details of the logic circuit 28 are illustrated in FIG. 3. It is pointed out that this employs a plurality of silicon controlled rectifiers which act as trippable means. A characteristic of a silicon controlled rectifier is that it will become fully conducting once a predetermined threshhold potential on the control electrode has been exceeded and thereafter it remains conducting until the anode potential has been reduced to near zero or reversed. It will be understood that this is a trippable characteristic and the change to the conducting state may be used to create an output pulse after which no further potentials on the control electrode will have any effect until the controlled rectifier has been reset by changing the anode potential as indicated.

Throughout the remainder of this description, the term silicon controlled rectifier will be designated by the quite conventional abbreviation SCR.

It is pointed out that there is a flip-flop circuit employing two of the SCRs in the logic circuit 28. This acts as bi-stable means in a conventional manner for flip-flop circuits, such as is well known to one skilled in this art.

In FIG. 3, it will be noted that there are two inputs 85 and 86. These have resistors, 87 and 88 respectively, connected across them; and the output signals from the trigger circuits 24 and 25 (FIG. 1) respectively are developed as potential drops across these resistors.

The action of the logic circuit (FIG. 3) may be traced beginning with the signal that will first appear at the input 85, i.e., that is developed across the resistor 87. This signal is coupled through a capacitor 91 to the gate of a silicon controlled rectifier 92. This SCR 92 will conduct only after a positive signal of predetermined amplitude is received at its gate, and the resistor 87 plus another resistor 95 will provide discharge paths for the capacitor 91 when the SCR 92 is not conducting.

When the SCR 92 conducts, almost full supply voltage is placed across an indicator light 96. This will provide a positive going pulse via another capacitor 99 to another SCR 100. The indicator light 96 and a resistor 103 form a discharge path for capacitor 99 when neither of the SCRs 92 or 100 is conducting.

There is another SCR 106 which together with the SCR 100 forms a flip-flop which employs a negative going pulse via a capacitor 107 to turn either SCR 100 or SCR 106 off when the one that is non-conducting receives a positive pulse on its gate.

There is a double pole reset switch 110 that sets the SCR 106 on, SCR 100 off and SCR 92 off. This is for resetting conditions at the beginning of each viscosity determination. Under the conditions indicated the trigger 24 (input 85 — FIG. 3) always receives the first meniscus pulse signal. Consequently, the SCR 92 conducts, which in turn causes the SCR 100 to conduct and this then turns off the SCR 106 via capacitor 107. The anode of SCR 100 becomes less positive due to increasing IR drop across a resistor 111 which thus produces a negative going pulse that is coupled to the anode of the SCR 106. That negative going pulse cuts off conduction of the SCR 106. Then with no current flow through SCR 106, a junction point 116 of connections to the capacitor 107, an indicator light 114, a capacitor 115 and the anode of the SCR 106, goes to positive supply potential.

The foregoing action gives a positive going pulse through the capacitor 115 to an OR circuit which allows positive pulses to the relay driver circuit over an output circuit 118.

There are a pair of diodes 119 and 120 which together with a resistor 123 make up the foregoing OR circuit. Also, there is a resistor 124 which together with the SCR 100 (when conducting) form a path for discharge of another capacitor 127.

When the second meniscus passage causes a signal to be passed on via the other trigger 25 (FIG. 1) it will give a positive pulse which appears over input circuit 86 (FIG. 3) and is developed across the resistor 88 and passed on via a capacitor 128. This causes the SCR 106 to conduct and the SCR 100 to be turned off. At the same time the positive pulse thus developed is coupled via the capacitor 127 to the diode 119 and thus over the OR circuit to the relay driver over the output circuit 118. At this time the capacitor 115 can discharge through a resistor 130 and the SCR 106 that is conducting. Such action will complete two contact closures of the relay 34, as will appear in greater detail below. Such contact closures provide the computer input with the necessary signals for calculating the viscosity of the fluid in the column 11.

It will be noted that after the two meniscus passage signals, the logic circuit is in such condition that both the SCR 92 and the SCR 106 are conducting so that it is impossible to have pulses from either of the trigger circuits (inputs 85 or 86) cause any further actuation of the relay driver circuit (output 118) until the logic circuit has been reset.

When the reset switch 110 is closed the SCR 92 is reset to non-conducting status. At the same time the SCR 106 remains on, or will be turned on via a capacitor 131. Also, the SCR 100 remains off, or is turned off by increasing load resistance through the resistor 111 via added resistance of a resistor 134 which makes the total load resistance too high to support conduction. The resistor 134 also insures a positive potential on the capacitor 127 side of capacitor 107 which prevents the generation of a positive pulse that would give a relay closure when the reset switch is depressed.

Under reset conditions, it will be possible to get a pulse only from input 85 (trigger 24) and impossible from the other input 86 (trigger 25).

A resistor 135 is for discharging the capacitor 131 when the SCR 106 is not conducting, and it also provides a low impedence path to the power supply negative return for noise signal pick-up that might come from long leads to a remote located reset switch. The indicator light 96 also provides a low impedence path for noise pick-up.

Details of the relay driver circuit 33 (FIG. 1) are illustrated in FIG. 4. This circuit acts to provide energization of relay 34 for a predetermined time duration upon each actuation thereof. Thus, with reference to FIG. 4, it will be noted that there is an input circuit 138 that will be connected to the output circuit 118 (FIG. 3) of the logic circuit 33. There are two SCRs 141 and 142 that form a flip-flop circuit between inputs from the input circuit 138 and the output of a timing circuit that includes a unijunction transistor 145.

A positive pulse coming over the input circuit 138 to the gate of the SCR 141 will cause it to conduct, and a negative going pulse will be developed at the anode of SCR 141. That negative going pulse will be transmitted to the anode of the other SCR 142 via a capacitor 146 which will cause the SCR 142 to turn off.

The relay 34 has a coil 149 that is energized when the SCR 141 conducts, and when energized it closes a set of contacts 150 which provide a computer input signal over the pair of circuit wires 37, as explained above. Under the foregoing, relay energized conditions, a junction point 151 (where one side of the capacitor 146, a resistor 153, another resistor 154, another resistor 155 and the anode of the SCR 142 are all connected) will rise to the supply positive potential. That will place enough voltage on the circuitry including the unijunction transistor 145 so as to cause it to work.

The unijunction circuitry is a timing circuit, and under control of the RC time of resistor 155 and a capacitor 158, the charge on the capacitor will rise until the unijunction transistor 145 conducts. That will give positive triggering to the gate of the SCR 142 after which it will conduct and consequently turn off the other SCR 141. The turning off of SCR 141 will, of course, de-energize the coil 149 and thus release the relay 34.

The relay driver circuit (FIG. 4) will remain in the state to which it returned until a positive pulse is again received at the gate of the SCR 141. That will cause a repeat of the foregoing sequence of operations. The time duration of the closing of relay 34 will thus be determined by the values of the RC elements and this will be predetermined so as to provide the desired latch-in time for the computer input.

While a particular embodiment of the invention has been described in considerable detail in accordance with the applicable statutes, this is not to be taken as in any way limiting the invention but merely as being descriptive thereof.

I claim:

1. Apparatus for providing output signals corresponding to a viscosity measurement of a liquid that includes timing the passage of a meniscus of a column of the liquid, comprising in combination first means for sensing the passage of said meniscus at a predetermined location along said column and for providing a first signal representative thereof, second means for sensing the passage of said meniscus at a second predetermined location along said column spaced from said first location and for providing a second signal representative thereof, and logic circuit means for receiving said first and second signals in sequence and for providing said output signals said logic circuit having two input circuits and an output circuit and including
   a. trippable means in each of said input circuits for passing no signals after having been tripped but passing a pulse signal when tripped after having been set,
   b. bi-stable means associated with said trippable means, and
   c. said bi-stable means including one of said trippable means.

2. Apparatus according to claim 1 wherein said circuit means (c) comprises
   ca. an OR circuit, and
   cb. means for converting each of said output signals into a corresponding computer input signal having a predetermined time duration.

3. Apparatus according to claim 2 wherein said trippable means (a) comprises
   aa. a silicon controlled rectifier.

4. Apparatus according to claim 3 wherein said bi-stable means (b) comprises
   ba. a pair of silicon controlled rectifiers, and
   bb. circuit means for interconnecting said silicon controlled rectifiers to set one non-conducting when the other is tripped into conduction.

5. Apparatus according to claim 4 wherein said means for converting each of said pulse signals (cb) comprises
   cba. a relay,
   cbb. means for energizing said relay from said output signals, and
   cbc. timing means for holding said relay energized for a predetermined time duration.

6. Apparatus for providing output signals corresponding to a viscosity measurement of a liquid that includes timing the passage of a meniscus of a column of the liquid, comprising in combination first means for sensing the passage of said meniscus at a predetermined location along said column and for providing a first signal representative thereof, second means for sensing the passage of said meniscus at a second predetermined location along said column spaced from said first location and for providing a second signal representative thereof, and logic circuit means for receiving said first and second signals in sequence and for providing said output signals said logic circuit means comprising
   6a. a silicon controlled rectifier in each of said input circuits,
   6b. one of said silicon controlled rectifiers for passing said output signals from either of said input circuits,
   6c. an OR circuit including a pair of rectifiers for passing said output signals from either of said input circuits,
   6d. a relay having contacts in an input circuit for said computer and having a coil for actuating said contacts, and
   6e. relay driver means connected to said OR circuit and having timing means for determining the duration of energization of said coil upon receipt of each of said output signals.

7. A circuit adapted to receive a reset signal and having two input circuits and an output circuit, comprising in combination
   7a. trippable means in each of said input circuits for passing no signals after having been tripped but passing a pulse signal when tripped after having been set by a received reset signal,
   7b. bi-stable means associated with said trippable means,
   7c. said bi-stable means including one of said trippable means, and
   7d. circuit means connected to said bi-stable means for providing output signals at said output circuit.

8. A logic circuit according to claim 7 wherein said trippable means (7a) comprises
  7aa. a silicon controlled rectifier.

9. A logic circuit according to claim 8 wherein said bi-stable means (7b) comprises
  7ba. a pair of silicon controlled rectifiers, and
  7bb. circuit means for interconnecting said silicon controlled rectifiers to set one non-conducting when the other is tripped into conduction.

10. A logic circuit according to claim 9 wherein said circuit means (7d) comprises
  7da. an OR circuit including a pair of rectifiers for passing said output signals.

11. A logic circuit according to claim 10 wherein said circuit means for interconnecting (7bb) comprises
  7bba. a flip-flop circuit, and
  7bbb. circuit means for connecting a third silicon controlled rectifier in one of said input circuits, and
  7e. further including reset means for resetting said third silicon controlled rectifier and holding or resetting said flip-flop circuit to receive an input signal from a predetermined one of said input circuits.

12. A logic circuit according to claim 11 further including a pair of indicating lights for visual indication of the state of said bi-stable means and of said third silicon controlled rectifier.

13. Apparatus for providing output signals corresponding to a viscosity measurement of a liquid that includes timing the passage of a meniscus of a column of the liquid, comprising in combination
  first means for sensing the passage of said meniscus at a predetermined location along said column and for providing a first signal representative thereof,
  second means for sensing the passage of said meniscus at a second predetermined location along said column spaced from said first location and for providing a second signal representative thereof, and
  circuit means for receiving said first and second signals in sequence and for providing said output signals.

* * * * *